Nov. 13, 1934.  E. L. DIXON  1,980,750
EDUCATIONAL DEVICE
Filed Sept. 14, 1932
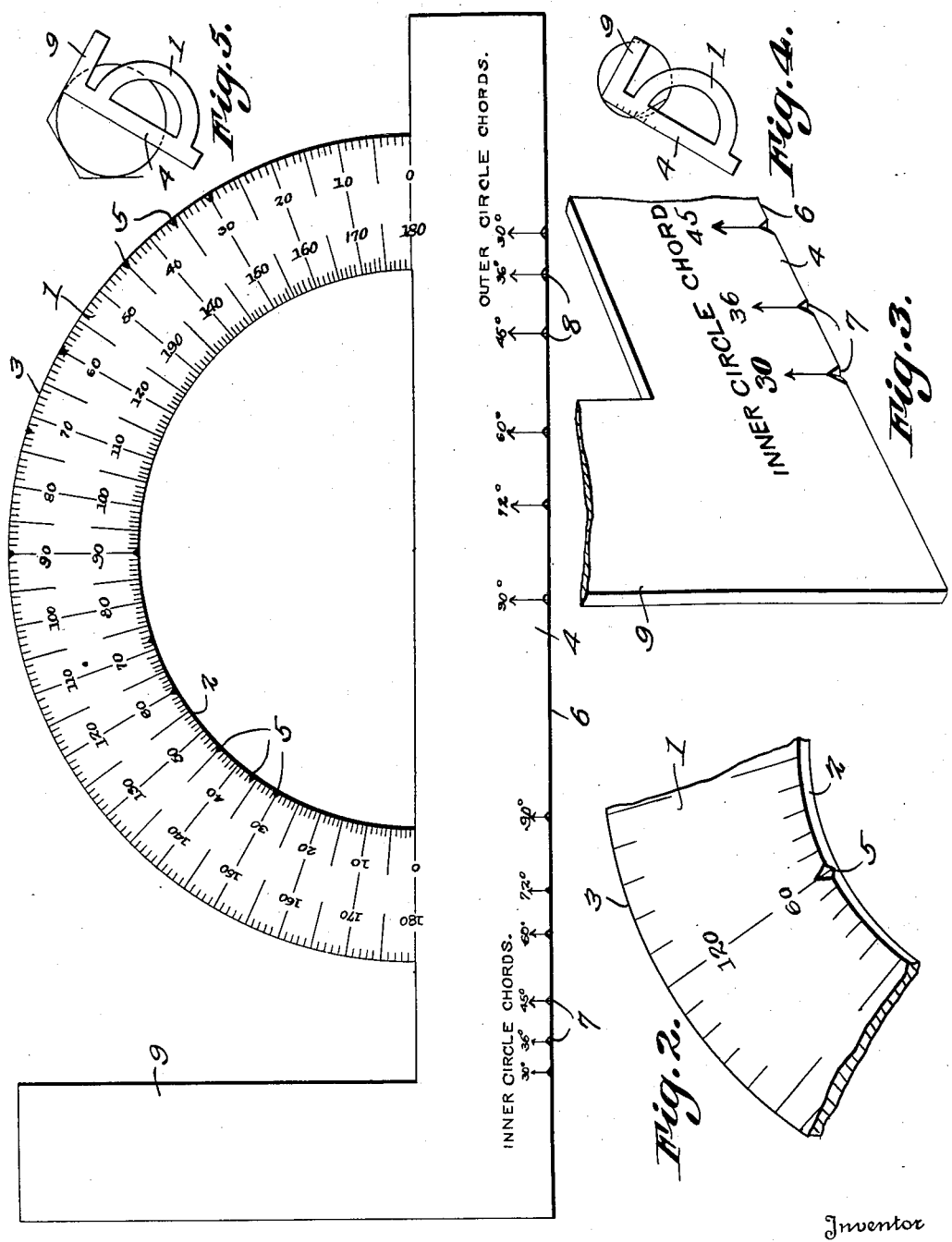
Inventor
E. L. Dixon
By F. B. Wooden.
Attorney Patented Nov. 13, 1934

1,980,750

UNITED STATES PATENT OFFICE 1,980,750

EDUCATIONAL DEVICE

Edna Leola Dixon, Baltimore, Md.

Application September 14, 1932, Serial No. 633,189

2 Claims. (Cl. 33—104)

This invention relates to an educational device to be used in the teaching of mathematics and more particularly for instruction in geometrical functions of regular polygons and has for its object the provision of an instrument whereby the fundamental theorems of arcs and chords defining regular polygons may be readily understood by the student.

Another object is the construction of a device whereby circles may be drawn on the vertical surface of the usual schoolroom blackboard with more facility than with other instruments now in use.

Another object is the provision of an instrument whereby the normal student may learn visually or motorially from practical instruction and the blind may learn as well, tactually, by use of the same instrument.

With these and other objects in view which will appear as the description proceeds, the invention contemplates the provision of an instrument that will enhance the utility of devices of that class to which the present invention appertains.

It will be understood that although the preferred embodiment of the invention has been shown, minor changes may be made within the scope of what is claimed without departing from the spirit of the invention or sacrificing any of the advantages thereof.

In the drawing,

Figure 1 is a plan view of the device.

Figure 2 is a perspective view of a portion of the semi-circular member.

Figure 3 is a perspective view of a portion of the base or straight portion of the device.

Figure 4 is a diagrammatical view illustrating one of the uses of the device.

Figure 5 is a diagram illustrating another use.

In the drawing the numeral 1 designates a semi-circular member having inner and outer edges 2 and 3 respectively and defining two concentric semi-circles. Formed integral with the member 1 and connecting the ends of the semi-circular member is a bar 4. A portion of the upper edge of the bar extends through the center of the semi-circle and represents the diameters of the two semi-circular edges. Each of the edges 2 and 3 is divided into degrees and those degrees indicating one arc of regular polygons of a predetermined number of sides are marked by indentations or depressions 5, in the surface of the member 1.

The bar 4 at its lower edge 6 is marked by spaced indentations 7. The space measured from the left end of the bar 4 to the marks 7 represents the length of the chords of regular polygons inscribed on a circle having a diameter equal to the diameter inscribed by the inner edge of the member 1.

Likewise from the right end of the bar 4 are located notches 8 similar to the notches 7 and defining chords of regular inscribed polygons of a circle having a diameter equal to the outer edge 3 of the member 1.

It will be observed that for the sake of convenience the indentations 5 formed on the inner edge of the member 1 are located on the left quadrant of the said member and the indentations on the bar, corresponding thereto are located on the left of the bar, whereas the indentations indicating arcs and chords on the outer circle and bar respectively are on the right quadrant and right end of the bar respectively.

At one end of the bar 4 an extension 9 is formed, defining a right angle with the edges of the bar 4.

The right angle extension 9 is useful in demonstrating to the student a number of geometrical principles, for instance, by applying the device to a circle as shown in Figure 5, it may be shown that a line perpendicular to a radius at its outer extremity is tangent to a circle. In the same manner the construction of a circumscribed regular polygon may be illustrated.

The construction of inscribed regular polygons may be demonstrated by the use of the instrument as shown in Fig. 4, the circle being first drawn by stenciling either the inner or outer edge of the member 1, then giving the instrument a one half rotation and then stenciling the other half of the circle. Having drawn the circle, and having decided on the number of sides the finished polygon shall have, the arcs maybe set off by use of the indentations 5 or the chords may be measured and drawn by use of the edge 6 of the device and the indentations 8 or 9.

Theorems such for instance as the following may be clearly demonstrated by use of the instrument as above described.

If a circle is divided into a number of equal arcs, chords connecting the successive points of division enclose a regular inscribed polygon.

Many others will suggest themselves to those skilled in the art and it is thought unnecessary to further enumerate its uses. The task of teaching the blind will be greatly facilitated by use of this instrument. The blind student will of necessity use a soft paper such as blotting paper on which to construct the figures, the indentations on the instrument depicting the arcs and chords to the blind student as readily as to one with sight.

Having thus described the invention what is claimed is:

1. A device for making possible the drawing of regular polygons by the blind, comprising a member having a semi-circular edge, and a bar permanently connected to said member and having a fiducial edge, said member being provided on its semi-circular edge with notches defining the arcs subtended by the sides of regular polygons inscribed on a circle of which the semi-circular edge forms part, the bar being provided on its fiducial edge with notches which are spaced apart at such distances as to define the length of the sides of the aforesaid polygons, all of the notches mentioned being of sufficient depth and width as to be identified readily by a blind person by means of the sense of touch.

2. A device for making possible the drawing of regular polygons by the blind, comprising a member having inner and outer semi-circular edges, and a bar permanently connected to said member and having a fiducial edge, said member being provided on its semi-circular edges with notches defining the arcs subtended by the sides of regular polygons inscribed on circles of which the semi-circular edges form part, the bar being provided on its fiducial edge with sets of notches, the notches of each set being spaced apart at such distances, and being so located with respect to the ends of the bar as to define the length of the sides of the polygons inscribed on circles of which the inner and outer semi-circular edges form part, all of the notches mentioned being of sufficient depth and width as to be identified readily by a blind person by means of the sense of touch.

EDNA LEOLA DIXON.